United States Patent
Ellis (10) Patent No.: US 12,365,398 B2
(45) Date of Patent: Jul. 22, 2025

(54) RETRACTABLE TAILGATE ASSEMBLY

(71) Applicant: Rickey Ellis, Farmington Hills, MI (US)

(72) Inventor: Rickey Ellis, Farmington Hills, MI (US)

( * ) Notice: Subject to any disclaimer, the term of this patent is extended or adjusted under 35 U.S.C. 154(b) by 319 days.

(21) Appl. No.: 17/978,110

(22) Filed: Oct. 31, 2022

(65) Prior Publication Data

US 2024/0140539 A1 May 2, 2024

(51) Int. Cl.
*B62D 33/027* (2006.01)
*B62D 33/03* (2006.01)

(52) U.S. Cl.
CPC ......... *B62D 33/0273* (2013.01); *B62D 33/03* (2013.01)

(58) Field of Classification Search
CPC ............... B62D 33/0273; B62D 33/03; E05Y 2900/544
USPC ..................................... 296/51, 61
See application file for complete search history.

(56) References Cited

U.S. PATENT DOCUMENTS

| | | | | |
|---|---|---|---|---|
| 2,431,588 A * | 11/1947 | Sharpe | ............... | B62D 33/0273 296/50 |
| 3,010,760 A * | 11/1961 | Trautmann | ............... | B60J 5/103 296/37.16 |
| 4,580,828 A * | 4/1986 | Jones | ...................... | B60J 5/108 296/57.1 |
| 5,104,172 A | 4/1992 | Schildt | | |
| 5,123,692 A * | 6/1992 | Couvillion | ......... | B62D 33/0273 296/180.1 |
| 5,393,192 A * | 2/1995 | Hall | ....................... | B60P 1/431 296/61 |
| 5,468,114 A * | 11/1995 | Hickerson | ............... | B60P 1/435 296/61 |
| 5,803,523 A * | 9/1998 | Clark | ...................... | B60P 1/435 296/61 |
| D399,468 S | 10/1998 | Lund | | |
| 5,829,945 A * | 11/1998 | Stanley | ................... | B60P 1/433 414/522 |
| 6,276,738 B1 * | 8/2001 | Marshall | ............ | B62D 33/0276 296/57.1 |
| 6,302,465 B1 * | 10/2001 | Faber | ...................... | B60P 1/003 296/50 |
| 6,464,276 B1 * | 10/2002 | Gruich | ............... | B62D 33/0273 224/403 |
| 6,464,278 B2 * | 10/2002 | Bailey | ................ | B62D 33/0273 296/57.1 |

(Continued)

FOREIGN PATENT DOCUMENTS

WO WO2019236967 12/2019

*Primary Examiner* — Gregory A Blankenship (57) ABSTRACT

A retractable tailgate assembly includes a truck that has a bed and a tailgate that is movably disposed on the bed. A retracting unit is integrated into the truck and the retracting unit is positioned beneath the bed. The retracting unit is mechanically coupled to the tailgate. The retracting unit is actuatable into an extending condition thereby facilitating the tailgate to be positioned between the closed position and the open position. Conversely, the retracting unit is actuatable into a retracting condition having the tailgate retracted beneath the bed thereby facilitating cargo to be loaded into the bed without being impeded by the tailgate. Additionally, the retracting unit includes a hydraulic piston attached to the tailgate.

8 Claims, 7 Drawing Sheets

(56) References Cited

U.S. PATENT DOCUMENTS

| | | | | |
|---|---|---|---|---|
| 7,128,357 | B1* | 10/2006 | Carroll | B60P 1/431 |
| | | | | 296/61 |
| 7,422,262 | B2* | 9/2008 | Marshall | B62D 33/0273 |
| | | | | 296/57.1 |
| 7,547,056 | B2 | 6/2009 | Waldner | |
| 7,607,711 | B2* | 10/2009 | Marshall | B62D 33/0273 |
| | | | | 296/51 |
| 8,141,929 | B2* | 3/2012 | Marshall | B62D 33/0273 |
| | | | | 296/51 |
| 8,342,590 | B1* | 1/2013 | Richburg | B60P 1/26 |
| | | | | 296/57.1 |
| 10,023,248 | B1* | 7/2018 | Harlan | B62D 33/0273 |
| 10,048,113 | B2 | 8/2018 | Salter | |
| 2002/0180231 | A1* | 12/2002 | Fox | B60P 3/40 |
| | | | | 296/26.09 |
| 2008/0191507 | A1 | 8/2008 | Farber | |
| 2019/0375467 | A1 | 12/2019 | Tyagi | |
| 2024/0140539 | A1* | 5/2024 | Ellis | B62D 33/0273 |

\* cited by examiner

RETRACTABLE TAILGATE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tailgate devices and more particularly pertains to a new tailgate device for retracing a tailgate of a truck. The device includes a retracting unit, which includes a hydraulic piston, for retracting a tailgate of a truck beneath a bed of the truck. In this way cargo can be loaded into the bed of the truck without requiring a user to lean over the tailgate.

(2) Description of Related Art Including Information Disclosed Under 37 CFR 1.97 and 1.98

The prior art relates to tailgate devices including a retractable tailgate of a truck that includes a pair of rails each disposed beneath a bed of a truck for facilitating the tailgate to be manually slid beneath the bed. The prior art discloses a retractable tailgate of a truck that includes a tailgate comprised of a plurality of hinged panels thereby facilitating the tailgate to be folded beneath a bumper of the truck. The prior art discloses a tailgate mechanism that includes a hinged support to facilitate a tailgate to be positioned to extend downwardly from a bed of a truck. The prior art discloses a tailgate retraction device that includes a worm gear and a drive motor. The prior art discloses a retractable tailgate that includes a pivoting bearing.

BRIEF SUMMARY OF THE INVENTION

An embodiment of the disclosure meets the needs presented above by generally comprising a truck that has a bed and a tailgate that is movably disposed on the bed. A retracting unit is integrated into the truck and the retracting unit is positioned beneath the bed. The retracting unit is mechanically coupled to the tailgate. The retracting unit is actuatable into an extending condition thereby facilitating the tailgate to be positioned between the closed position and the open position. Conversely, the retracting unit is actuatable into a retracting condition having the tailgate retracted beneath the bed thereby facilitating cargo to be loaded into the bed without being impeded by the tailgate. Additionally, the retracting unit includes a hydraulic piston attached to the tailgate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
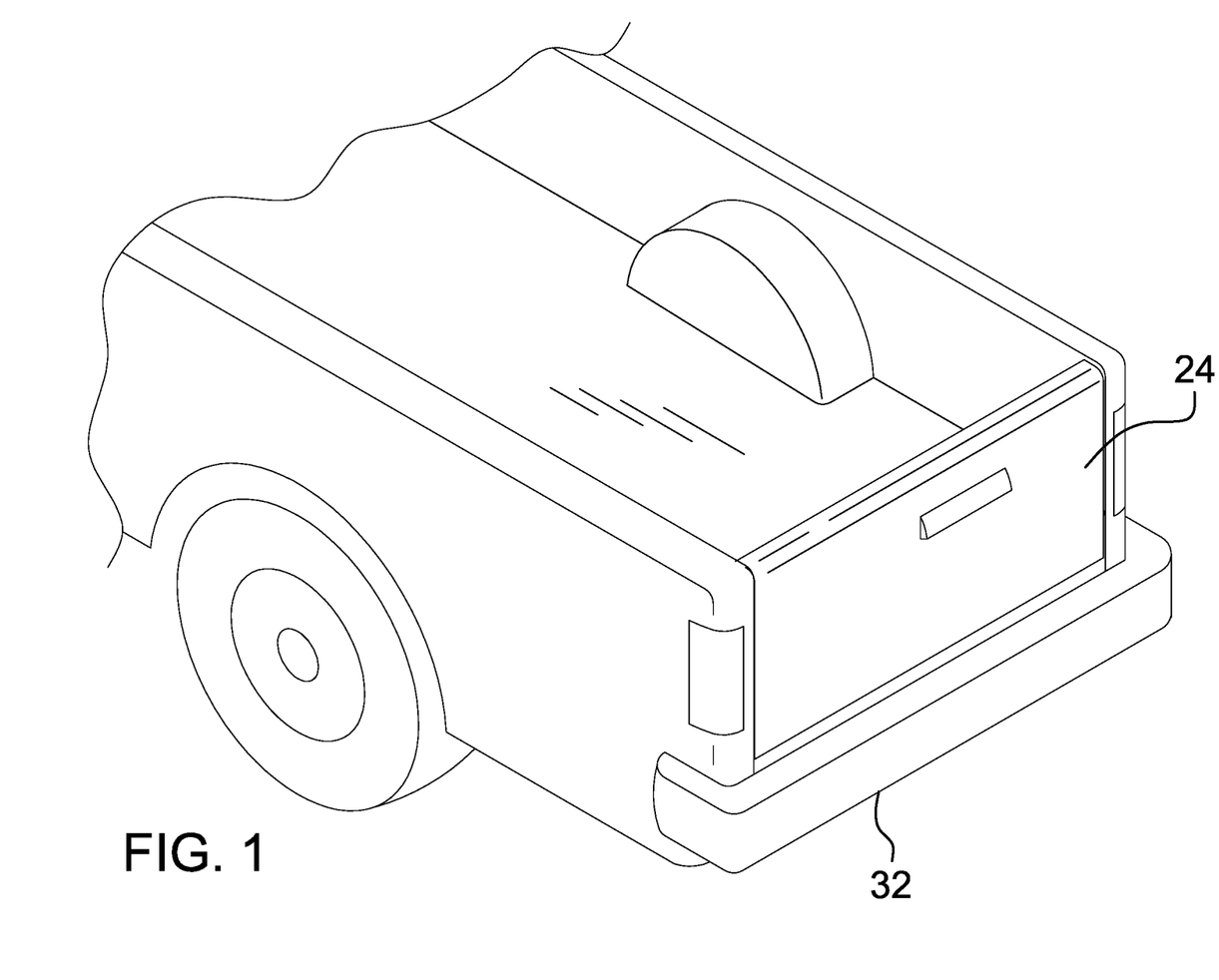
FIG. 1 is a back perspective view of a retractable tailgate assembly according to an embodiment of the disclosure showing a tailgate in a closed position.
Figure 2:
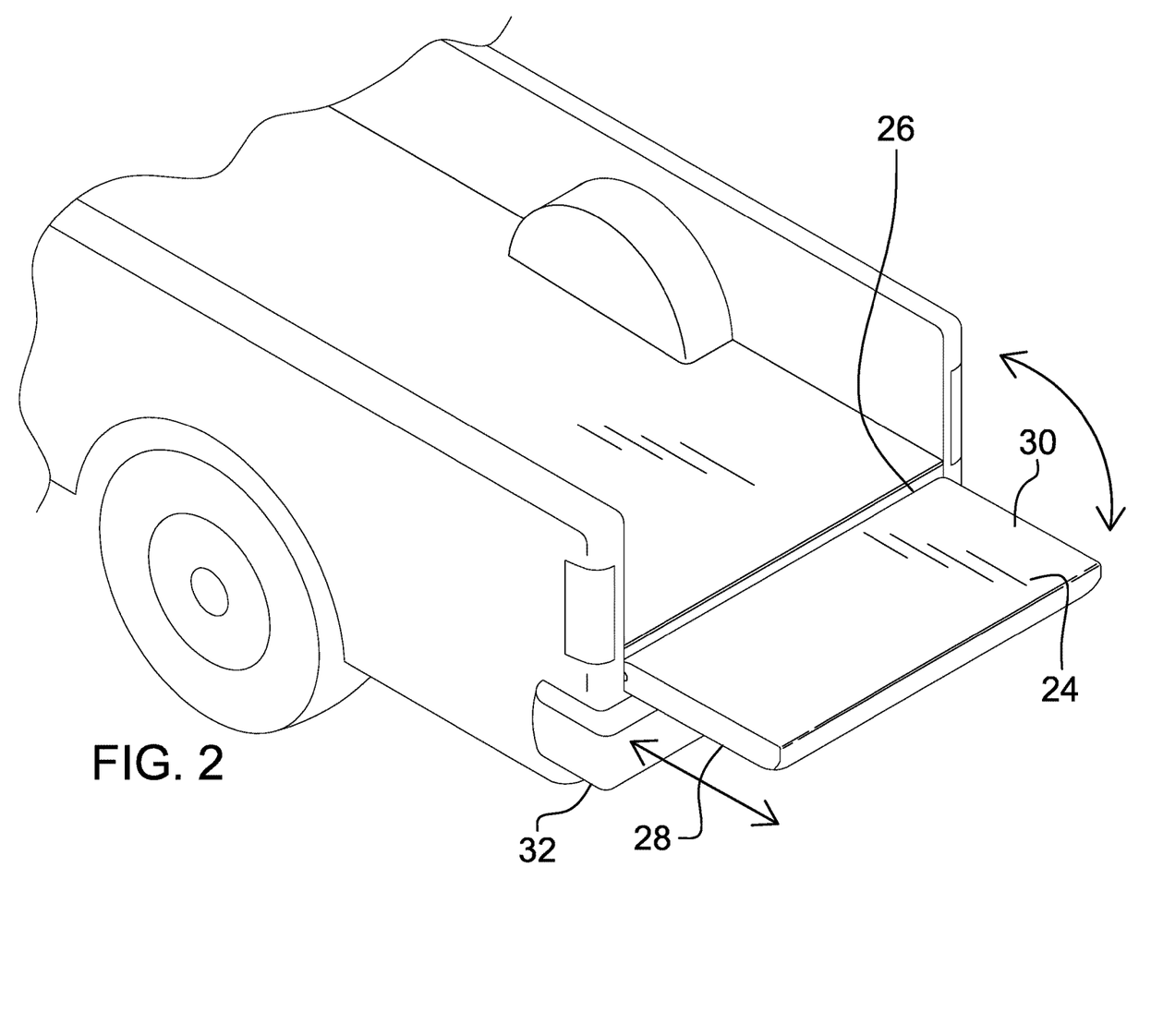
FIG. 2 is a back perspective view of an embodiment of the disclosure showing a tailgate in an open position.
Figure 3:
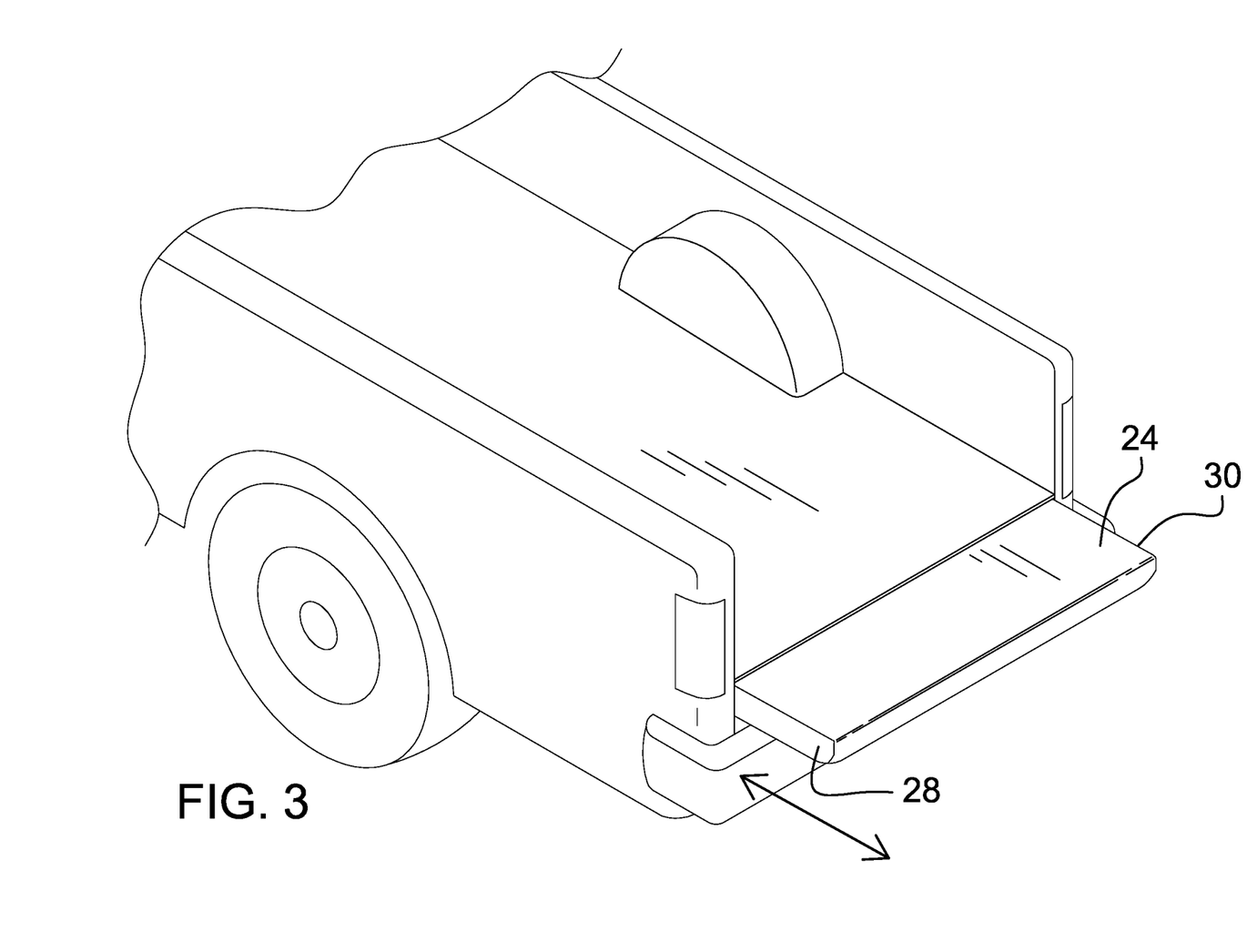
FIG. 3 is a back perspective view of an embodiment of the disclosure showing a tailgate being retracted beneath a bed of a truck.
Figure 4:
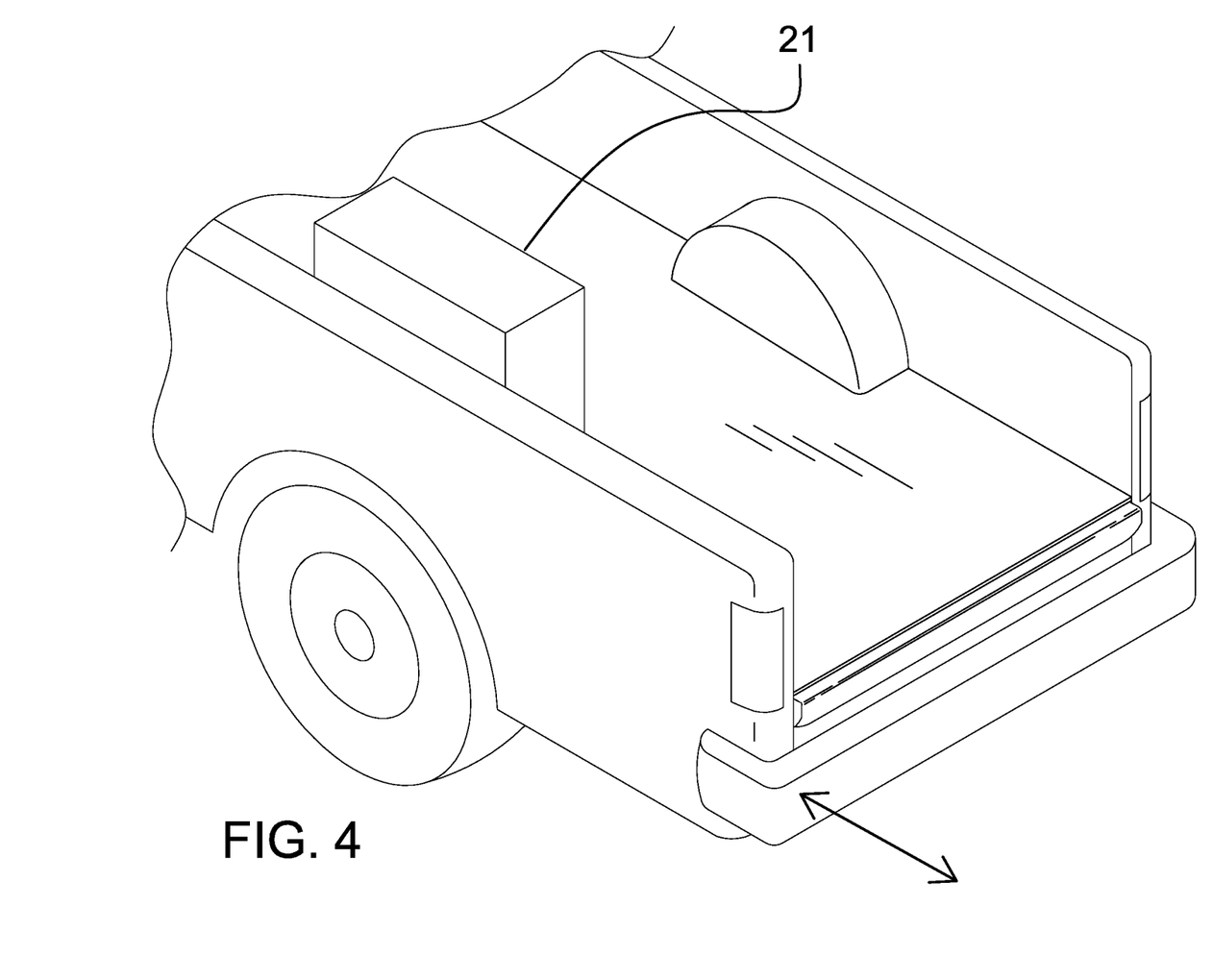
FIG. 4 is a back perspective view of an embodiment of the disclosure showing a tailgate being positioned beneath a bed of a truck.
Figure 5:
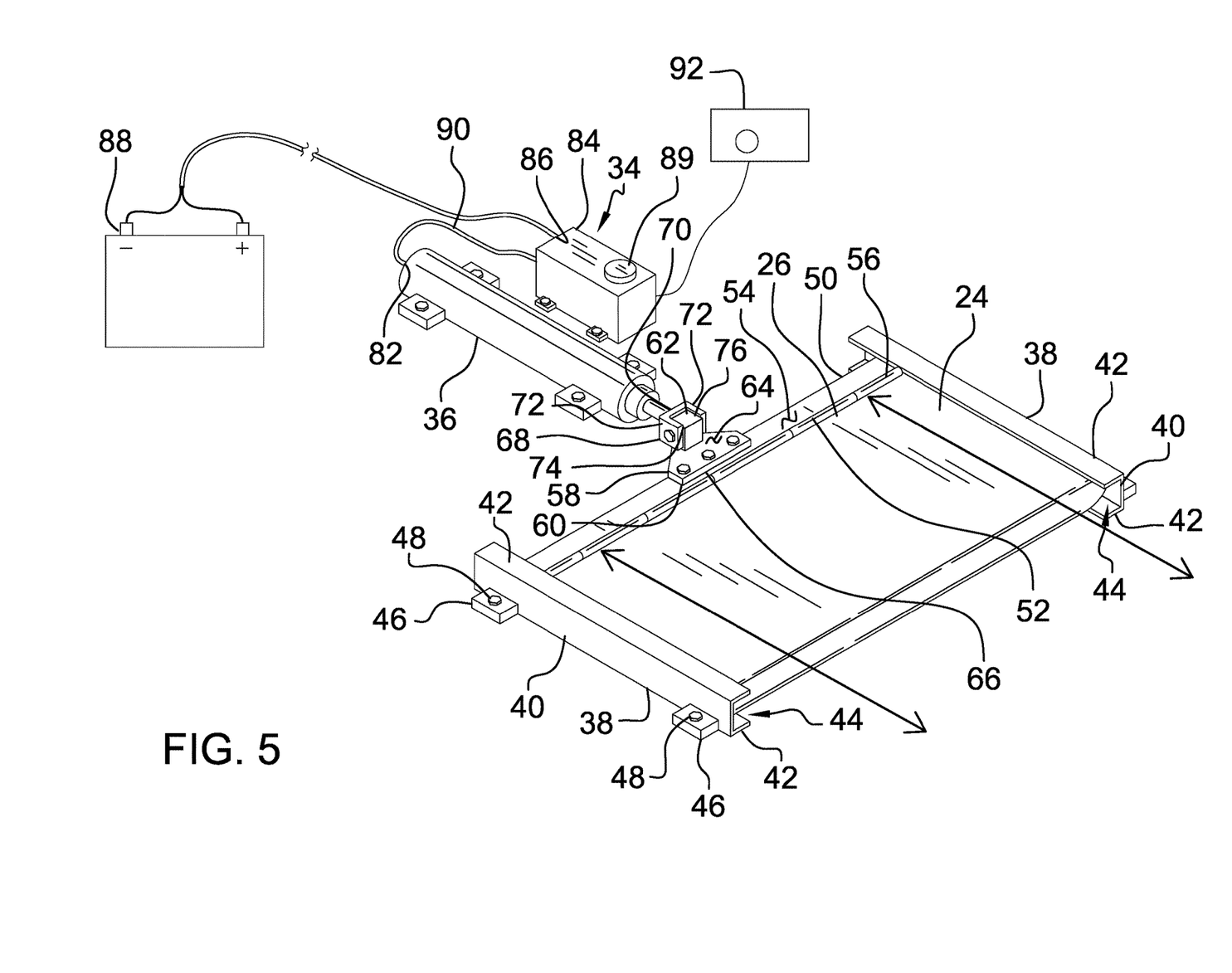
FIG. 5 is a perspective view of a retracting unit of an embodiment of the disclosure.
Figure 6:
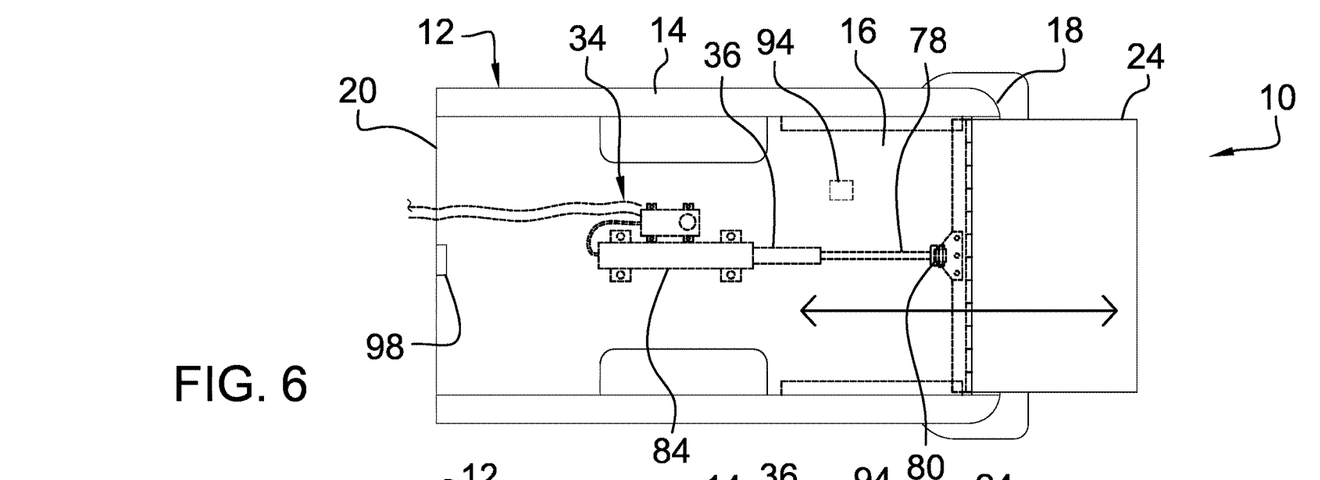
FIG. 6 is a top phantom view of an embodiment of the disclosure showing a retracting unit being actuated into an extending condition.
Figure 7:
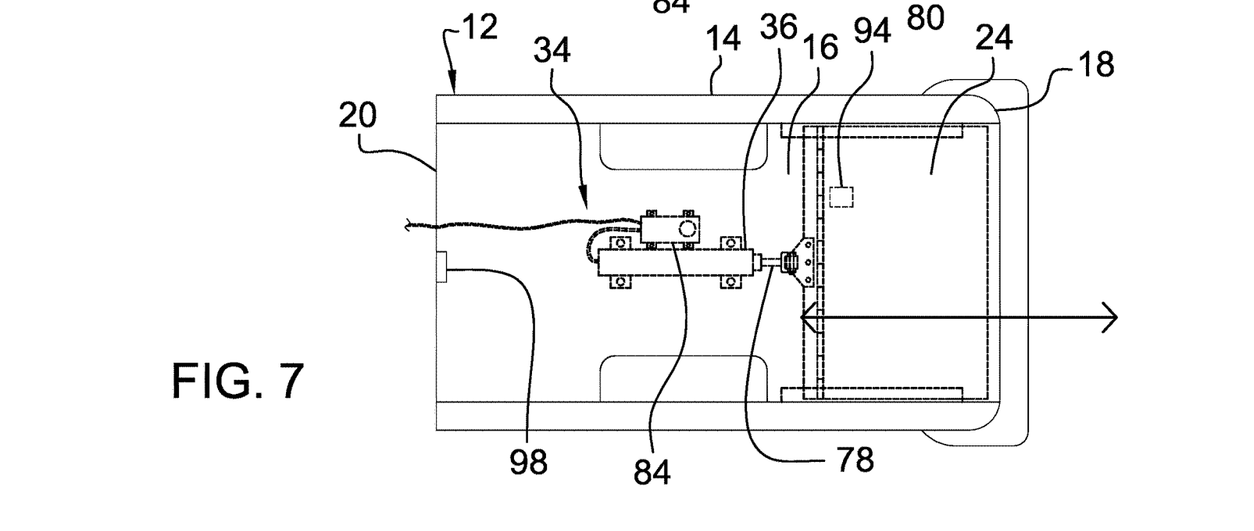
FIG. 7 is a top phantom view of an embodiment of the disclosure showing a retracting unit being actuated into a retracting condition.
Figure 8:
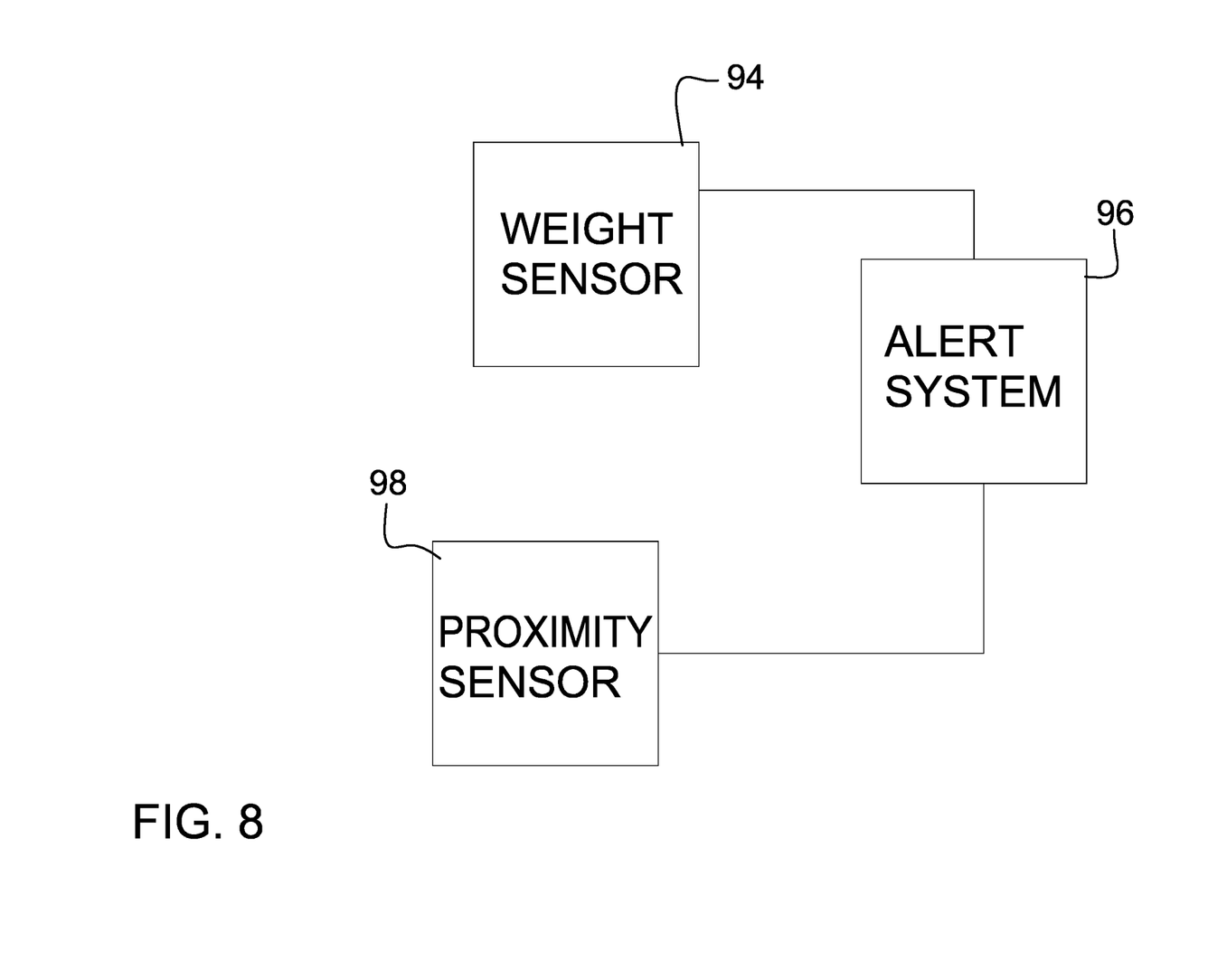
FIG. 8 is a schematic view of an embodiment of the disclosure.

With reference now to the drawings, and in particular to FIGS. 1 through 8 thereof, a new tailgate device embodying the principles and concepts of an embodiment of the disclosure and generally designated by the reference numeral 10 will be described.

As best illustrated in FIGS. 1 through 8, the retractable tailgate assembly 10 generally comprises a truck 12 that has a bed 14, and the bed 14 has a bottom wall 16, a rear end 18 and a front end 20. The rear end 18 is open for receiving cargo 21 and the bottom wall 16 has a lower surface 22. The truck 12 may be a pickup truck or any other motorized vehicle that has a bed for carrying cargo. A tailgate 24 is movably disposed on the bed 14 and the tailgate 24 is positionable in a closed position or an open position. The tailgate 24 has a lower edge 26, a first lateral edge 28 and a second lateral edge 30. The truck 12 has a rear bumper 32 and the rear bumper 32 is spaced below the bottom wall 16 as well as being positioned adjacent to the rear end 18 of the bed 14.

A retracting unit 34 is integrated into the truck 12, the retracting unit 34 is positioned beneath the bed 14 and the retracting unit 34 is mechanically coupled to the tailgate 24. The retracting unit 34 is actuatable into an extending condition having the tailgate 24 being exposed with respect to the rear end 18 of the bed 14 thereby facilitating the tailgate 24 to be positioned between the closed position and the open position. Conversely, the retracting unit 34 is actuatable into a retracting condition when the tailgate 24 is positioned in the open position having the tailgate 24 being retracted beneath the bed 14. In this way cargo 21 can be loaded into the bed 14 without being impeded by the tailgate 24. Furthermore, the retracting unit 34 includes a hydraulic piston 36 that is attached to the tailgate 24.

The retracting unit 34 comprises a pair of tracks 38 and each of the tracks 38 comprises a central panel 40 extending between a pair of outward panels 42. Each of the outward panels 42 is perpendicularly oriented with the central panel 40 to define a space 44 between the outward panels 42. Each of the tracks 38 includes a pair of mounting tabs 46 each extending laterally away from the central panel 40 in an opposing direction with respect to the outward panels 42. The pair of tracks 38 is disposed on the lower surface 22 of the bottom wall 16 of the bed 14, and each of the tracks 38 extends from the rear end 18 of the bed 14 toward the front end 20 of the bed 14. A plurality of fasteners 48 each extends through a respective one of the mounting tabs 46 and engages the truck 12 for mounting the tracks 38 to the truck 12. The tracks 38 are spaced apart from each other such that the outward panels 42 of each of the tracks 38 are directed toward each other. Each of the first lateral edge 28 and the second lateral edge 30 of the tailgate 24 travels along the space 44 defined in a respective track 38 when the retracting unit 34 is actuated in the retracting condition and the extending condition.

The retracting unit 34 includes a mounting member 50 that has a coupled edge 52 and a top surface 54, and the mounting member 50 has a hinge 56 that is disposed on the coupled edge 52. The hinge 56 hingedly engages the lower edge 26 of the tailgate 24 and the mounting member 50 is elongated to extend along a full length of the lower edge 26 of the tailgate 24. The retracting unit 34 includes a coupling bracket 58 that has a plate 60 and a stem 62 extending upwardly from a top surface 64 of the plate 60. The plate 60 is fastened to the top surface 54 of the mounting member 50 having a bottom surface 66 of the plate 60 abutting the top surface 54 of the mounting member 50. The plate 60 may have an increasing width between the stem 62 and the hinge 56 such that the plate has a wedge shape. The retracting unit 34 includes a yoke 68 which has a middle portion 70 extending between a pair of lateral portions 72. Each of the lateral portions 72 is pivotally attached to a respective one of a first lateral surface 74 and a second lateral surface 76 of the stem 62 of the coupling bracket 58 having the middle portion 70 being directed toward the front end 20 of the bed 14.

The hydraulic piston 36 includes a rod 78 that has a first end 80 and the first end 80 is coupled to the middle portion 70 of the yoke 68. The hydraulic piston 36 is oriented to extend along a line extending between the front end 20 and the back end of the bed 14. The hydraulic piston 36 is mounted to the lower surface 22 of the bottom wall 16 of the bed 14 and the hydraulic piston 36 has a fluid inlet 82. A hydraulic pump 84 is mounted to the lower surface 22 of the bottom wall 16 of the bed 14 and the hydraulic pump 84 has a fluid outlet 86. Additionally, the hydraulic pump 84 is electrically coupled to a power source 88 comprising an electrical system of the truck 12. The hydraulic pump 84 may include a hydraulic fluid reservoir 89 for storing a hydraulic fluid.

The retracting unit 34 includes a hydraulic hose 90 that is fluidly coupled between the fluid outlet 86 of the hydraulic pump 84 and the fluid inlet 82 of the hydraulic piston 36. The hydraulic pump 84 urges a hydraulic fluid into the hydraulic piston 36 when the hydraulic pump 84 is actuated into a first condition. The hydraulic pump 84 urges the hydraulic fluid outwardly from the hydraulic piston 36 when the hydraulic pump 84 is actuated into a second condition. The rod 78 extends outwardly from the hydraulic piston 36 when the hydraulic pump 84 is actuated into the first condition. Conversely, the rod 78 is retracted into the hydraulic piston 36 when the hydraulic pump 84 is actuated into the second condition. The retracting unit 34 includes a control 92 that is coupled to the truck 12 and the control 92 is electrically coupled to the hydraulic pump 84. The hydraulic pump 84 is actuated into the first condition when the control 92 is manipulated into an extending position. Conversely, the hydraulic pump 84 is actuated into the second condition when the control 92 is manipulated into a retracting position. The hydraulic pump 84 may comprise an electric fluid pump or the like that would commonly be employed in hydraulic systems.

A weight sensor 94 may be included which is attached to the bottom wall 16 of the bed 14 for sensing the weight of the bed 14. Additionally, the weight sensor 94 may be electrically coupled to an alert system 96 of the truck 12 such that the alert system 96 of the truck 12 emits an alert when the cargo 21 in the bed 14 exceeds a predetermined weight. A proximity sensor 98 may be included which might be attached to the front end of the bed 14 to detect when the cargo 21 is positioned within a predetermined distance of the front end 20 of the bed 14. Furthermore, the proximity sensor 98 may be electrically coupled to the alert system 96 of the truck 12 such that the alert system 96 emits an alert when once the cargo 21 is positioned within the predetermined distance of the front end 20 of the bed 14. In this way the cargo 21 is inhibited from damaging a rear window of the truck 12, for example, due to being positioned too close to the front end 20 of the bed 14. The weight sensor 94 may be an electronic weight sensor or the like and the proximity sensor 98 may be an electronic proximity sensor or the like.

In use, the tailgate 24 is opened and closed in the conventional fashion of tailgates when the retracting unit 34 is in the extending condition. The control 92 is manipulated to actuate the retracting unit 34 in the retracting condition when the tailgate 24 is positioned in the open position. In this way the tailgate 24 is retracted beneath the bed 14 to facilitate a user to load cargo 21 into the bed 14 without having to lean over the tailgate 24 to access the rear end 18 of the bed 14. The truck 12 can be driven with tailgate 24 retracted beneath the bed 14 or with the tailgate 24 extended from beneath the bed 14, depending on the user's preference.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A retractable tailgate assembly for retracting a tailgate beneath a bed of a truck, said assembly comprising:
   a truck having a bed, said bed having a bottom wall, a rear end and a front end, said rear end being open for receiving cargo, said bottom wall having a lower surface;
   a tailgate being movably disposed on said bed, said tailgate being positionable in a closed position or an open position, said tailgate having a lower edge; and
   a retracting unit being integrated into said truck, said retracting unit being positioned beneath said bed, said retracting unit being mechanically coupled to said tailgate, said retracting unit being actuatable into an extending condition having said tailgate being exposed with respect to said rear end of said bed thereby facilitating said tailgate to be positioned between said closed position and said open position, said retracting unit being actuatable into a retracting condition when said tailgate is positioned in said open position having said tailgate being retracted beneath said bed thereby facilitating cargo to be loaded into said bed without being impeded by said tailgate, said retracting unit including a hydraulic piston being attached to said tailgate, said retracting unit comprising
      a pair of tracks, each of said tracks comprising a central panel extending between a pair of outward panels, each of said outward panels being perpendicularly oriented with said central panel to define a space between said outward panels, each of said tracks including a pair of mounting tabs each extending laterally away from said central panel in an opposing direction with respect to said outward panels, said pair of tracks being disposed on said lower surface of said bottom wall of said bed, each of said tracks extending from said rear end of said bed toward said front end of said bed, said tracks being spaced apart from each other such that said outward panels of each of said tracks is directed toward each other, and
      a mounting member having a coupled edge and a top surface, said mounting member having a hinge being disposed on said coupled edge, said hinge hingedly engaging said lower edge of said tailgate, said mounting member being elongated to extend along a full length of said lower edge of said tailgate.

2. The assembly according to claim 1, wherein said retracting unit includes a coupling bracket having a plate and a stem extending upwardly from a top surface of said plate, said plate being fastened to said top surface of said mounting member having a bottom surface of said plate abutting said top surface of said mounting member.

3. The assembly according to claim 2, wherein said retracting unit includes a yoke having a middle portion extending between a pair of lateral portions, each of said lateral portions being pivotally attached to a respective one of a first lateral surface and a second lateral surface of said stem of said coupling bracket having said middle portion being directed toward said front end of said bed.

4. The assembly according to claim 3, wherein said hydraulic piston includes a rod having a first end, said first end being coupled to said middle portion of said yoke, said hydraulic piston being oriented to extend along a line extending between said front end and said back end of said bed, said hydraulic piston being mounted to said bottom surface of said bottom wall of said bed.

5. The assembly according to claim 1, wherein:
   said bed has a bottom wall, said bottom wall having a lower surface; and
   said retracting unit includes a hydraulic pump being mounted to said bottom surface of said bottom wall of said bed, said hydraulic pump having a fluid outlet, said hydraulic pump being electrically coupled to a power source comprising an electrical system of said truck.

6. The assembly according to claim 5, wherein:
   said hydraulic piston has a fluid inlet; and
   said hydraulic piston includes a rod;
   said retracting unit includes a hydraulic hose being fluidly coupled between said fluid outlet of said hydraulic pump and said fluid inlet of said hydraulic piston, said hydraulic pump urging a hydraulic fluid into said hydraulic piston when said hydraulic pump is actuated into a first condition, said hydraulic pump urging the hydraulic fluid outwardly from said hydraulic piston when said hydraulic pump is actuated into a second condition, said rod extending outwardly from said hydraulic piston when said hydraulic pump is actuated into said first condition, said rod being retracted into said hydraulic piston when said hydraulic pump is actuated into said second condition.

7. The assembly according to claim 6, further comprising a control being coupled to said truck, said control being electrically coupled to said hydraulic pump, said hydraulic pump being actuated into said first condition when said control is manipulated into an extending position, said hydraulic pump being actuated into said second condition when said control is manipulated into a retracting position.

8. A retractable tailgate assembly for retracting a tailgate beneath a bed of a truck, said assembly comprising:
   a truck having a bed, said bed having a bottom wall, a rear end and a front end, said rear end being open for receiving cargo, said bottom wall having a lower surface;
   a tailgate being movably disposed on said bed, said tailgate being positionable in a closed position or an open position, said tailgate having a lower edge, a first lateral edge and a second lateral edge; and
   a retracting unit being integrated into said truck, said retracting unit being positioned beneath said bed, said retracting unit being mechanically coupled to said tailgate, said retracting unit being actuatable into an extending condition having said tailgate being exposed with respect to said rear end of said bed thereby facilitating said tailgate to be positioned between said closed position and said open position, said retracting unit being actuatable into a retracting condition when said tailgate is positioned in said open position having said tailgate being retracted beneath said bed thereby facilitating cargo to be loaded into said bed without being impeded by said tailgate, said retracting unit including a hydraulic piston being attached to said tailgate, said retracting unit comprising:
- a pair of tracks, each of said tracks comprising a central panel extending between a pair of outward panels, each of said outward panels being perpendicularly oriented with said central panel to define a space between said outward panels, each of said tracks including a pair of mounting tabs each extending laterally away from said central panel in an opposing direction with respect to said outward panels, said pair of tracks being disposed on said lower surface of said bottom wall of said bed, each of said tracks extending from said rear end of said bed toward said front end of said bed, said tracks being spaced apart from each other such that said outward panels of each of said tracks is directed toward each other;
- a mounting member having a coupled edge and a top surface, said mounting member having a hinge being disposed on said coupled edge, said hinge hingedly engaging said lower edge of said tailgate, said mounting member being elongated to extend along a full length of said lower edge of said tailgate;
- a coupling bracket having a plate and a stem extending upwardly from a top surface of said plate, said plate being fastened to said top surface of said mounting member having a bottom surface of said plate abutting said top surface of said mounting member;
- a yoke having a middle portion extending between a pair of lateral portions, each of said lateral portions being pivotally attached to a respective one of a first lateral surface and a second lateral surface of said stem of said coupling bracket having said middle portion being directed toward said front end of said bed;
- wherein said hydraulic piston includes a rod having a first end, said first end being coupled to said middle portion of said yoke, said hydraulic piston being oriented to extend along a line extending between said front end and said back end of said bed, said hydraulic piston being mounted to said bottom surface of said bottom wall of said bed, said hydraulic piston has a fluid inlet;
- a hydraulic pump being mounted to said bottom surface of said bottom wall of said bed, said hydraulic pump having a fluid outlet, said hydraulic pump being electrically coupled to a power source comprising an electrical system of said truck;
- a hydraulic hose being fluidly coupled between said fluid outlet of said hydraulic pump and said fluid inlet of said hydraulic piston, said hydraulic pump urging a hydraulic fluid into said hydraulic piston when said hydraulic pump is actuated into a first condition, said hydraulic pump urging the hydraulic fluid outwardly from said hydraulic piston when said hydraulic pump is actuated into a second condition, said rod extending outwardly from said hydraulic piston when said hydraulic pump is actuated into said first condition, said rod being retracted into said hydraulic piston when said hydraulic pump is actuated into said second condition; and
- a control being coupled to said truck, said control being electrically coupled to said hydraulic pump, said hydraulic pump being actuated into said first condition when said control is manipulated into an extending position, said hydraulic pump being actuated into said second condition when said control is manipulated into a retracting position.

* * * * *